Figure 1:
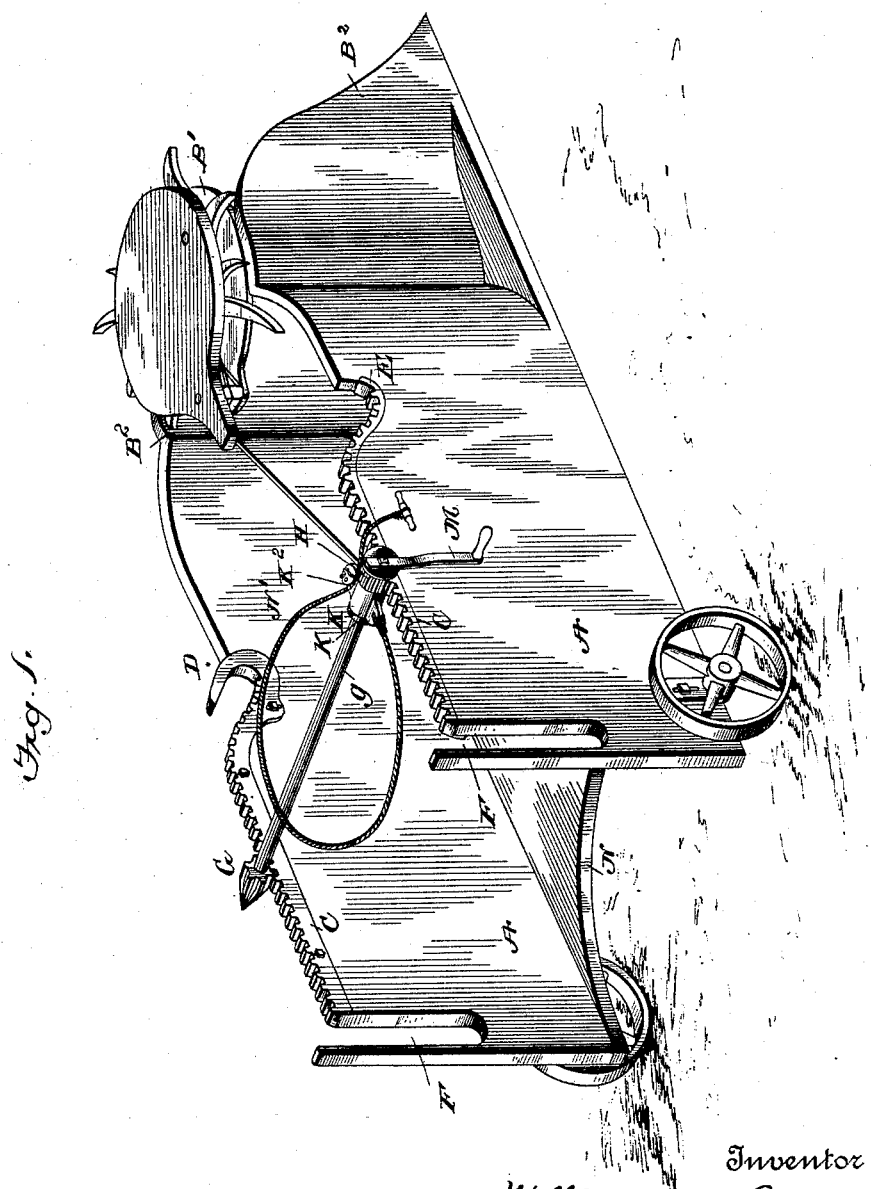

(No Model.) 2 Sheets—Sheet 1.

W. K. LIGGETT.
CORN HARVESTER.

No. 524,639. Patented Aug. 14, 1894.

Witnesses

Inventor
William K. Liggett
By R. S. & A. P. Lacey, Attorneys (No Model.) 2 Sheets—Sheet 2.
W. K. LIGGETT.
CORN HARVESTER.
No. 524,639. Patented Aug. 14, 1894.
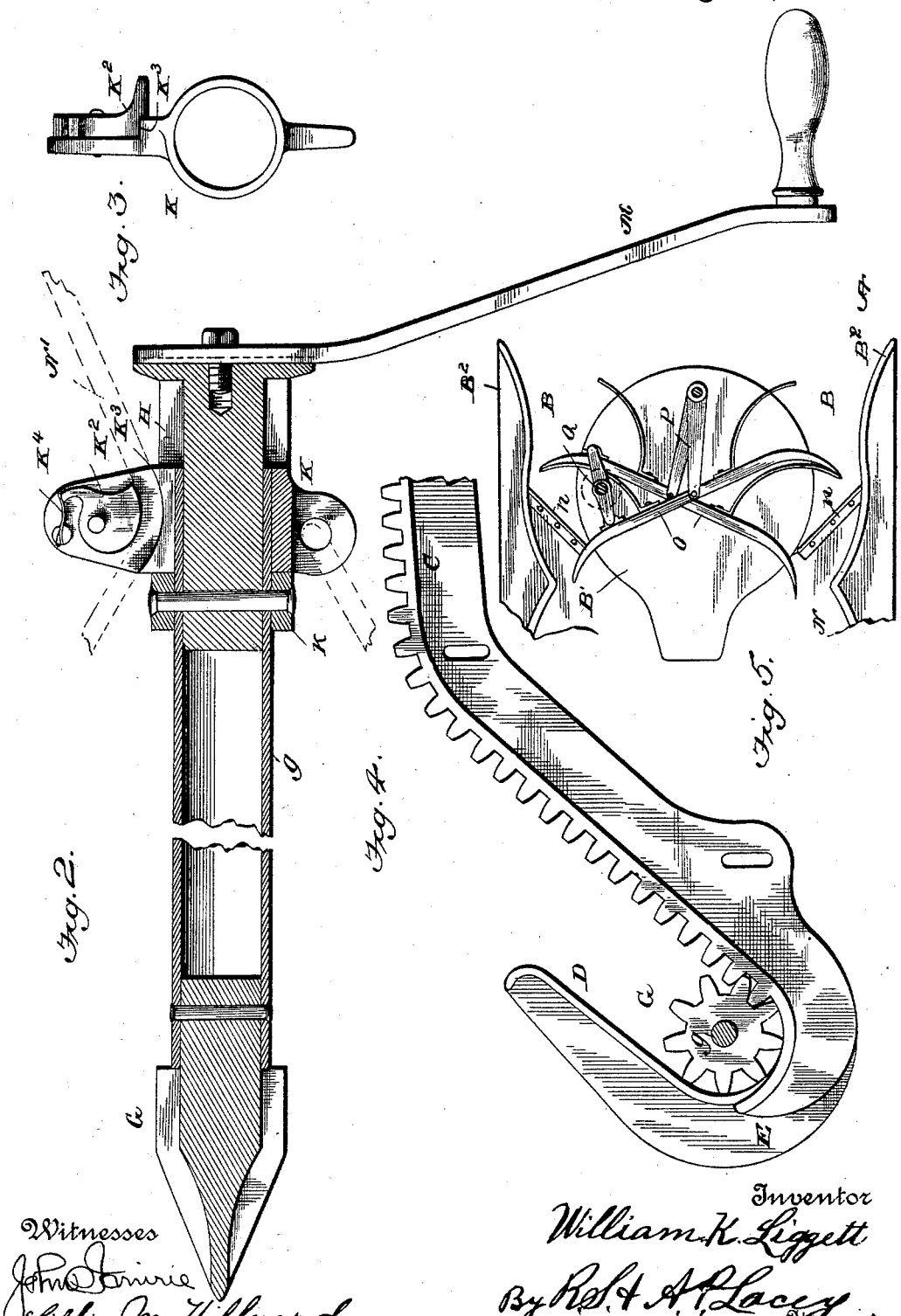

UNITED STATES PATENT OFFICE.

WILLIAM K. LIGGETT, OF COLUMBUS, OHIO.

CORN-HARVESTER.

SPECIFICATION forming part of Letters Patent No. 524,639, dated August 14, 1894.

Application filed November 9, 1893. Serial No. 490,455. (No model.)

*To all whom it may concern:*

Be it known that I, WILLIAM K. LIGGETT, a citizen of the United States, residing at Columbus, in the county of Franklin, State of Ohio, have invented certain new and useful Improvements in Corn-Harvesters; and I do hereby declare the following to be a full, clear, and exact description of the invention, such as will enable others skilled in the art to which it appertains to make and use the same.

This invention relates primarily to that class of corn harvesters which cut the stalks of corn and carry them along in vertical position until enough has accumulated to form a shock.

The object of the invention is to provide a simple and efficient means for first clamping the said shock, then lifting and carrying it to the rear to clear the table, and finally to drop it from any desired height vertically to the ground steadying it in its fall so that it can not tip in any direction. Heretofore this operation has been accomplished by various forms of swinging derricks having either horizontal or vertical axis; systems of levers arranged in parallelograms and split platforms both with sliding and hinged leaves. From the nature of the material to be handled all these forms are both cumbersome and unwieldy and add materially to the weight of the machine while they do their work in a very unsatisfactory manner. For this class of machinery, the true way to handle a shock of corn is to pick it up as a unit, carry it to the rear far enough to clear the platform, then drop it vertically to the ground, steadying it in its fall. It will thus be impossible to rack or twist the shock or for it to fall in any other but a vertical position while if the height of the fall be great enough the butts of the stalks will be embedded in the earth so firmly that the shock will stand when properly tied. These results are effected by means of the devices illustrated in the accompanying drawings, in which—

Figure 1 is an isometric perspective view of a corn harvester embodying the invention. Fig. 2 is a top plan view, partly in section, of the shock binding devices. Fig. 3 is an end view of the head to which the ends of the rope are attached, one end of the rope being fixed the other adjustably connected with the said head by a pawl or dog. Fig. 4 is a detail view in elevation of the elevating or inclined ends of the toothed tracks, showing the hooks and the relative position of the shaft which supports the shock during its elevation, transit and deposit. Fig. 5 is a plan view of the forward end of the machine, the top plate of the central frame being removed to show the gathering arms and the actuating mechanism.

The devices shown for gathering and severing the stalks and for packing them in a shock are foreign to this invention and while I prefer for the sake of illustration those shown and discribed in my pending applications, it will readily be seen that this invention will apply to any form of corn harvesting machinery in which the shock is formed in a vertical position.

The passages B are formed, one on each side of the central frame work B' between it and the guards $B^2$. The cutters $n$ are located at the inner ends of the passages B and secured to the platform N. The gathering arms O are pivotally connected midway of their ends to vibrating arms P and are operated by a crank shaft Q. These parts are shown and form the basis of other patents and are illustrated to show an operative machine.

On either side of the shock forming platform N I erect a wall or frame work A thus providing a chamber the front end of which leads to the passages B through which the stalks enter while the rear end is open to allow the shock to be deposited on the ground. This rear end may be temporarily closed by cords, springs or other devices corresponding to the needs of the particular instrumentalities used to form the shock the same being no part of this invention.

The tops of the walls A constitute or are formed into suitably shaped tracks C which taking their origin from the hooks D and E, rise abruptly at first then more gradually until they end in the vertical slots F. The hook D being on the side farthest from the crank M is extended up along the rack some distance to hold the pinion in mesh. The other pinion can be kept in mesh while turning the crank. In order to make the movement positive I have placed a series of teeth on these tracks forming racks of them. Two pinions G, H adapted to engage with these racks are fitted to the ends of a shaft $g$ which also carries the rope fastening devices K, K², and the crank M. The whole being so constructed and arranged that it may be placed upon or removed from the racks C at the will of the operator. The shaft pinions and crank are rigidly fastened together while the head K bearing the rope fastening devices is free to turn on the shaft but is kept from sliding off by the collar $k$. The pinion G tapers or is pointed to enable it the more readily to be thrust through the shock of corn and into the hook D as hereinafter described.

The head K carrying the rope fastening devices may be made in any approved manner the preferred construction being a ring K into which the rope N is fastened and a pawl K² held against the ledge K³ by means of the spring K⁴. Said pawl being higher than the ledge in order to the more readily enter the rope between said pawl and ledge. The whole is so shaped and constructed as to resist all motion of the rope toward the shock but will readily yield to motion in the opposite direction.

The operation of the machine is as follows: The shock being formed on the table between the side walls A and the machine at a stand still, the shock is clamped, by thrusting the shaft $g$ carrying its pinions G, H, head K, rope N and crank M through the center of the shock just above the hooks D and E, the pinion G entering the hook D while the pinion H rests in the hook E. The crank being turned backward to run said pinions down to the bottom of said hooks. The rope N is next thrown around the shock over the pinion G and passed behind the pawl K² and drawn tight the pawl preventing the rope from slipping. The crank M is then turned causing the pinions to mount the track thus lifting the shock and carrying it to the rear of the table until they arrive at the slots F when they drop off allowing the shock to fall while the slots prevent any side motion. The shock is then permanently tied, the rope N released, the shaft $g$ withdrawn and the machine proceeds until another shock is formed. These devices may be likened to a traveling crane rather than a derrick.

The elevated tracks C may, by means of bolts and slotted holes or other devices, be made adjustable up and down to suit different heights of corn without departing from the spirit of my invention.

Having thus described my invention, what I claim, and desire to secure by Letters Patent, is—

1. In a corn harvester, the combination with the shock forming platform, of elevated tracks on each side of the said platform having inclined portions at the inner ends, and a shaft to be thrust through the shock and provided with shock binding devices and adapted to travel upon the said tracks, substantially as described for the purpose specified.

2. In a corn harvester, the combination with the shock forming platform, of elevated tracks on each side of the said platform having inclined portions at the inner ends, a shaft to be thrust through the shock and adapted to travel upon the said tracks, a head mounted upon the shaft and relatively free to turn thereon, a rope secured at one end to the said head, and clamping devices at the other end of the said head to adjustably secure the other end of the rope, substantially as and for the purpose described.

3. In a corn harvester, the combination with the shock forming platform, of elevated tracks on each side of the said platform having inclined portions at the inner ends, and having hooks at the beginning of the inclined end portions to constitute stops, and a shaft to be thrust through the shock and provided with shock binding devices and adapted to travel upon the said tracks, substantially as described for the purpose specified.

4. In a corn harvester, the combination with the shock forming platform, of elevated tracks on each side of the said platform having inclined portions at the inner ends, and having hooks at the beginning of the inclined end portions to constitute stops, one of the said hooks being longer than the other for the purpose described and a shaft to be thrust through the shock and provided with shock binding devices and adapted to travel upon the said tracks, substantially as described for the purpose specified.

5. In a corn harvester, the combination with the shock forming platform, of elevated tracks on each side of the said platform having inclined portions at the inner ends, and having approximately vertical slots at the rear ends, and a shaft to be thrust through the shock and provided with shock binding devices and adapted to travel upon the said tracks, substantially as described for the purpose specified.

6. In a corn harvester, the combination with the shock forming platform, of elevated tracks on each side of the said platform having inclined portions at the inner ends, said tracks being toothed, and a shaft having pinions at the ends to engage with the said toothed tracks and provided with the shock binding devices, substantially as described.

7. In a corn harvester, a shock forming table having passages for the stalks to enter, and having side walls provided with tracks which have inclined portions at their front ends, and vertical slots at the rear ends, in combination with a shock binding mechanism to travel on the said tracks and drop into the said slots, substantially as and for the purpose set forth.

In testimony whereof I affix my signature in presence of two witnesses.

WILLIAM K. LIGGETT.

Witnesses:
F. G. FULLINGTON,
WALTER E. MAYNARD.